A. H. CAVEN.
TROLLEY SWITCH.
APPLICATION FILED NOV. 15, 1913.
1,111,214.          Patented Sept. 22, 1914.
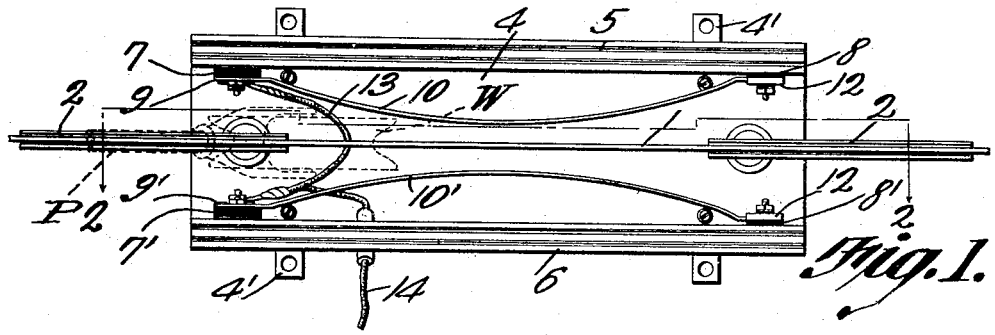
Fig. 1.
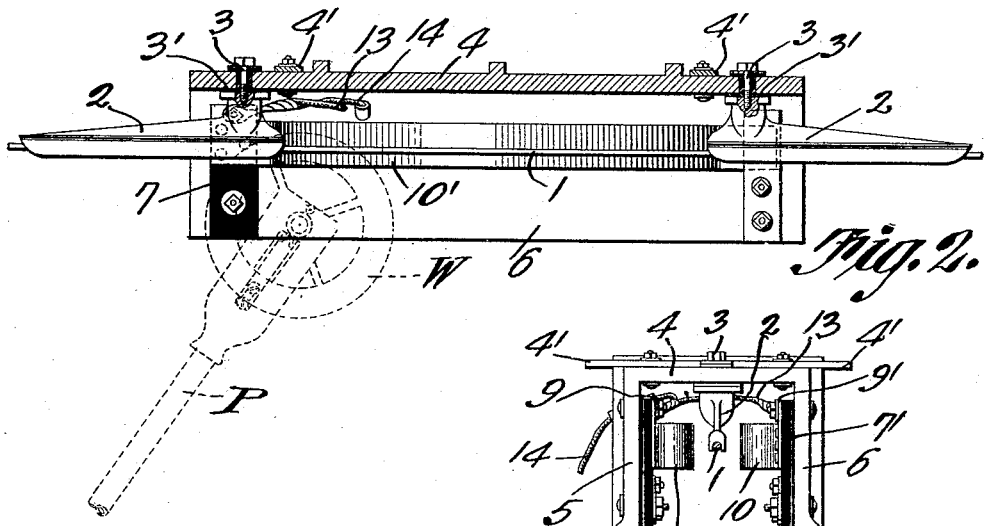
Fig. 2.
Fig. 3.
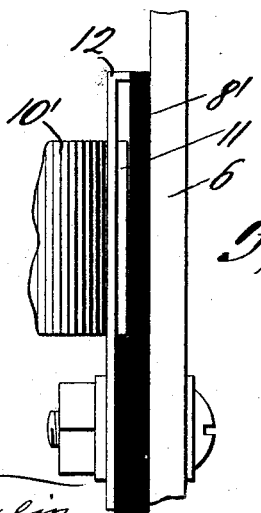
Fig. 4.
Witnesses
Alva H. Caven, Inventor
by C. A. Snow & Co.
Attorneys

UNITED STATES PATENT OFFICE.

ALVA HAYS CAVEN, OF YOUNGWOOD, PENNSYLVANIA.

TROLLEY-SWITCH.

1,111,214.  Specification of Letters Patent.  Patented Sept. 22, 1914.

Application filed November 15, 1913. Serial No. 801,184.

*To all whom it may concern:*

Be it known that I, ALVA H. CAVEN, a citizen of the United States, residing at Youngwood, in the county of Westmoreland and State of Pennsylvania, have invented a new and useful Trolley-Switch, of which the following is a specification.

The present invention relates to improvements in trolley switches, the particular switch being adapted to be used in connection with the signaling device and switch controlling mechanism as particularly set forth in my co-pending application filed December 17, 1913, Serial No. 807,296, one object of the present invention, being the provision of means adapted to be connected to an over-head trolley wire, and supported adjacent thereto, so that a circuit for energizing signal controlling solenoids or electro-magnets may be closed by a passing trolley wheel so that the current from the over-head trolley wire may be properly distributed from said trolley wire to said solenoid, and as particularly set forth in the above co-pending application.

A further object of the present invention, is the provision of a device which will be protected from sleet and snow, and which will properly house resilient contact members which are disposed upon each side of the trolley wire, and in a position to engage opposite faces of a passing trolley wheel to form the desired contact therebetween so that current from the trolley will be caused to pass through the wheel to such contact plates and be distributed therefrom to the desired point.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a bottom plan view of the present device, dotted lines illustrating the position of a trolley wheel when entering the same and just previous to the engagement of the resilient contacts thereof. Fig. 2 is a section taken on line 2—2 of Fig. 1. Fig. 3 is an end view looking from the left as viewed in Figs. 1 and 2. Fig. 4 is an enlarged detail view showing the mounting of the free end of one of the resilient contacts.

Referring to the drawings, the numeral 1 designates the over-head trolley wire, which is properly guided in the supports 2 which are connected by means of the insulated screws 3 to depend within the casing formed by the top wall 4 and the depending aprons 5 and 6 thereof, a strip 3' of insulation being interposed between the respective trolley wire supporting members 2 and the under side of the top 4 of the casing or hood. This casing, as clearly illustrated in Fig. 3, is an inverted U-shaped member and therefore provides a hood open at both ends for preventing sleet, rain or snow from effecting the portion of the trolley wire within the hood.

The supports 4' properly hold the housing supported and assist in maintaining the over-head trolley 1 in the desired position above the track.

Connected to the inner sides of the respective walls 5 and 6 are the strips 7—7' of insulation, these being disposed for instance, at the entrance end of the hood while disposed at the exit end thereof are the two strips 8—8' of insulation. By this means, as will presently appear, the two resilient switch or contact plates 10—10' are properly supported and insulated from the hood or casing.

Two metal plates 9 and 9' are connected to the inner faces of the blocks of insulation 7—7' and are electrically connected to the fixed ends of the two resilient plates 10—10', the free ends 11 thereof, as clearly shown in Fig. 4, being slidably mounted against the inner faces of the respective strips 8—8' of insulation and being held against too far inward movement by means of the guide plates 12.

Connected to the plates 9—9' is a conductor 13, which has electrically connected thereto, a conductor 14, this conductor 14 being extended to control the signaling apparatus as particularly set forth in my co-pending application, and the connection 13 insuring the proper distribution of the current from the plate 10. should the plate 10' fail when the trolley wheel W has its opposite faces engaged by the inner faces respectively of the plates 10—10', the resilient mounting of said plates permitting the proper engagement or contact of the wheel upon opposite sides so as to cause the wheel to close the circuit between the trolley 1 and either one or both of the plates 10—10'. Under normal conditions, the circuit is opened between the plates 10—10', and is only closed when the trolley wheel W carried by the pole P enters the hood or casing sufficiently far in the constricted portion of the space between the two plates 10—10' to engage the inner faces of the plates 10—10' and direct the current from the trolley 1 through the wheels W into either or both of the plates and consequently through the conductors 13 and 14, to the desired point.

What is claimed is:

A device of this character, including a hood, a trolley wire support mounted therein, a trolley wire mounted in the support and incased by the hood, two blocks of insulating material attached to the inner face adjacent the ends of one wall of the hood, a resilient plate having one end connected to one block of insulating material with its body disposed at one side of the trolley wire, the intermediate portion of the plate being curved inwardly to engage one side of the trolley wheel when the wheel is passing through the hood and is in contact with the trolley wire, and a metal plate attached to the remaining block of insulating material and coöperating therewith to form a guide for the free end of the plate.

In testimony that I claim the foregoing as my own, I have hereto affixed my signature in the presence of two witnesses.

ALVA HAYS CAVEN.

Witnesses:
 HOWARD WALLACE,
 E. W. TOMB.

---

Copies of this patent may be obtained for five cents each, by addressing the "Commissioner of Patents, Washington, D. C."